(12) United States Patent
Jain

(10) Patent No.: US 7,286,840 B2
(45) Date of Patent: Oct. 23, 2007

(54) RULE BASED PROCESSING OF SMS MESSAGES

(76) Inventor: Mahesh Kumar Jain, 20, Hi-Tech Apartments, $2^2$ Cross, Ganesha Block, Sultanpalya, Bangalore (IN) 560032

( * ) Notice: Subject to any disclaimer, the term of this patent is extended or adjusted under 35 U.S.C. 154(b) by 0 days.

(21) Appl. No.: 11/183,652

(22) Filed: Jul. 18, 2005

(65) Prior Publication Data

US 2006/0276208 A1 Dec. 7, 2006

(30) Foreign Application Priority Data

Jun. 7, 2005 (IN) .......................... 694/CHE/2005

(51) Int. Cl.
*H04Q 7/20* (2006.01)
(52) U.S. Cl. ................ 455/466; 455/412.1; 455/412.2; 455/414.1; 455/414.4; 455/445
(58) Field of Classification Search ................ 455/466, 455/412.1, 412.2, 414.1, 414.4, 445
See application file for complete search history.

(56) References Cited

U.S. PATENT DOCUMENTS

| | | | | |
|---|---|---|---|---|
| 6,700,954 B1 * | 3/2004 | Pflaum | ..................... | 379/88.13 |
| 6,731,625 B1 * | 5/2004 | Eastep et al. | ................ | 370/352 |
| 2003/0048880 A1 * | 3/2003 | Horvath et al. | .......... | 379/88.01 |
| 2003/0092454 A1 | 5/2003 | Halim | ......................... | 455/466 |
| 2004/0015056 A1 * | 1/2004 | Shinoda | ....................... | 600/300 |
| 2004/0081299 A1 * | 4/2004 | White | ...................... | 379/93.09 |
| 2005/0031096 A1 * | 2/2005 | Postrel | .................... | 379/88.22 |

FOREIGN PATENT DOCUMENTS

| | | | |
|---|---|---|---|
| ES | | 1361763 A1 | 11/2003 |
| WO | WO 2004/049679 A1 | | 6/2004 |

* cited by examiner

*Primary Examiner*—Lester G. Kincaid
*Assistant Examiner*—Diego Herrera
(74) *Attorney, Agent, or Firm*—Ash Tankha of Counsel, Lipton, Weinberger & Husick

(57) ABSTRACT

A method and system for receiving, processing and distributing SMS and MMS messages, which consists of a message processor and virtual or desktop clients. The message processor comprises of a rule processing agent that intelligently analyses incoming messages using a set of predetermined logic rules and directs the dispatching agent to deliver the final processed message to the recipients using one or more communication channels such as SMS, MMS, pop up message, e-mail, fax or phone call. The message processing system consists of virtual secretaries that are customizable for each user of the message processing system, each virtual secretary contains a set of user specific processing rules that accepts the user's request and applies its own set of processing rules, conducts a set of processing actions, and if required invokes the message processor to further carry rule processing or uses the dispatching agent to distribute the message.

18 Claims, 3 Drawing Sheets

RULE BASED PROCESSING OF SMS MESSAGES

BACKGROUND OF THE INVENTION

This invention generally relates to a telecommunication system and in particular to a method and system of processing and dispatching SMS and MMS messages.

The short messaging service (SMS) and multimedia messaging service (MMS) is one of the most widely used communication means among mobile users for person-to-person messaging, accessing information on demand and entertainment. Approximately one billion SMS messages are processed every day by mobile communication operators worldwide. SMS has captured a significant market share in person-to-person messaging and is now increasingly used for accessing information stored on the network of mobile communication operators. Even when the recipient mobile is switched off, or out of reach of the mobile network, the message is made available to the recipient when the recipient logs on to the network. The SMS and MMS messaging system is a store and forward messaging system There is a market need to deploy SMS and MMS messaging technology to enable enterprise users within the enterprise to interact with individuals outside the enterprise to interact with each other through a single messaging interface.

Messaging can be effectively used to enhance existing services, for example, customer relation management, alert or notification, order booking, production planning, sales force automation, distribution, hospitality and entertainment.

There is a market need for a messaging solution that seamlessly integrates and leverages the existing information technology in local area network or wide area networks (LAN/WAN), internet infrastructure, office server, enterprise servers, telecommunications and software solutions.

There is a market need for a messaging system that has the robustness of a traditional electronic private automatic branch exchange (EPABX) system and that also provides intelligent processing of incoming messages, logging of messages and a non-blocking storing mechanism for incoming messages during peak traffic periods.

The conventional EPABX system is limited to addressing voice-based services with minimal interface with other office automation tools. The conventional EPABX system also requires costly resources such as external public communication lines. The conventional EPABX systems allow a specific person in an organization to be contacted directly using a known extension number, using assistance from an interactive voice response IVR system or connection by a local or remote operator. The EPABX system provides a linkage to telephone service features, for example, voice mail, auto answering and paging to increase the effectiveness of communication within an organization. However, the EPABX system can become a bottleneck during certain periods. For example, during high call in periods, the EPABX causes blockages that decrease communication effectiveness and communication between remote sites, although internal communications may not be affected.

There is a market need for a supplement to the traditional voice-based EPABX with a message based communication system that intelligently processes messages, logs messages and provides a non-blocking mechanism for message queuing. There is also a market need for a solution that integrates SMS and Multimedia Messaging Service (MMS) messaging with the existing infrastructure of an enterprise and provides an intelligent access channel everywhere in the enterprise.

There is also a market need for an in-built virtual secretary to answer common queries by intelligent processing of the input messages.

SUMMARY OF THE INVENTION

A method and system for receiving, processing and distributing SMS and MMS messages, which consists of a message processor and virtual or desktop clients. The message processor comprises of a rule processing agent that intelligently analyses incoming messages using a set of predetermined logic rules and directs the dispatching agent to deliver the final processed message to the recipients using one or more communication channels such as SMS, MMS, pop up message, e-mail, fax or phone call. The message processing system consists of virtual secretaries that are customizable for each user of the message processing system, each virtual secretary contains a set of user specific processing rules that accepts the user's request and applies its own set of processing rules, conducts a set of processing actions, and if required invokes the message processor to further carry rule processing or uses the dispatching agent to distribute the message.

DETAILED DESCRIPTION OF THE INVENTION

Figure 1:
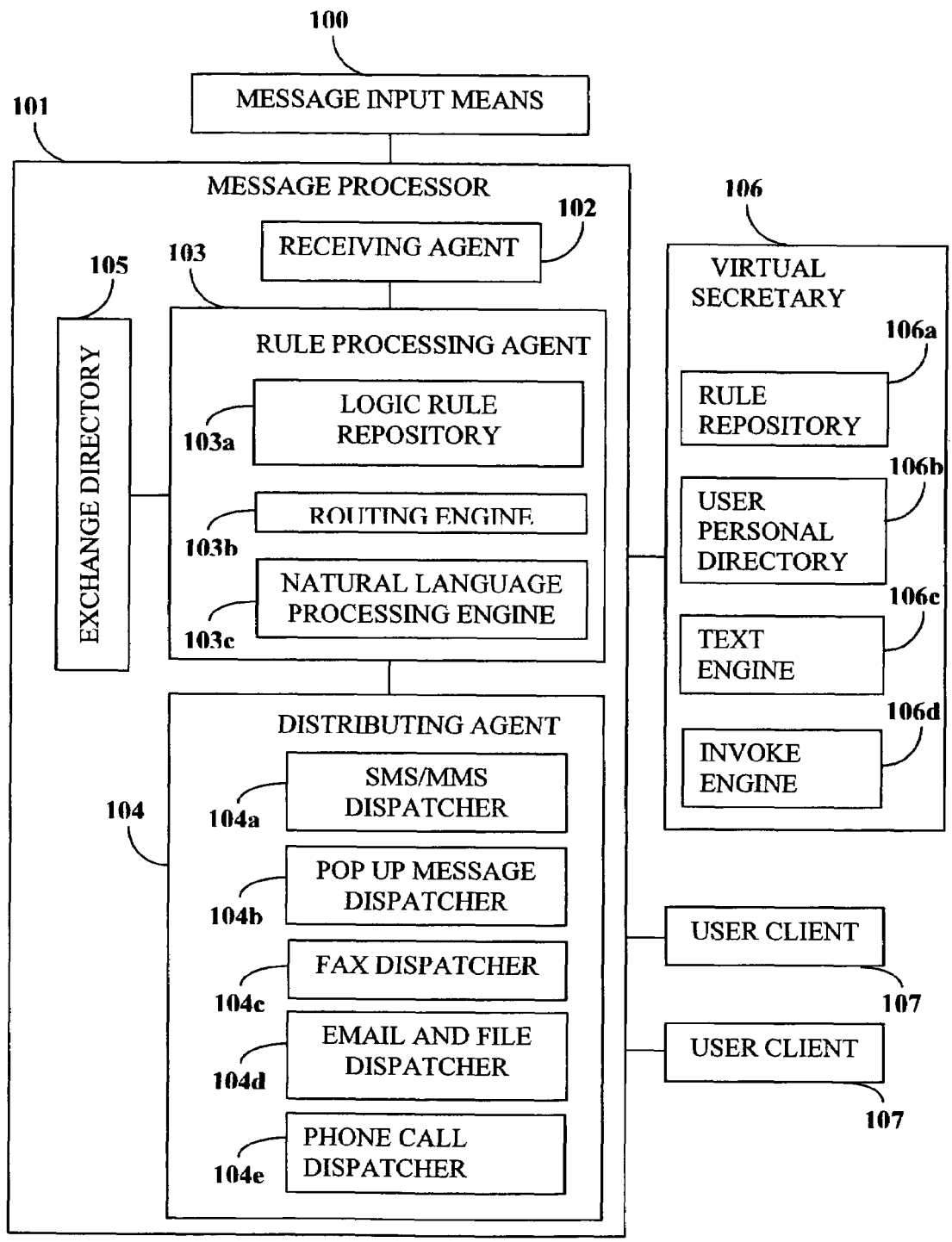
FIG. 1 illustrates the components of the system used for receiving, transmitting, processing and routing messages.

FIG. 1 illustrates the architecture of a message processing system used for receiving, processing and distributing messages. The message processing system consists of a message processor 101 and one or more virtual secretary 106 clients. The message processing system enables the administrator of the enterprise network to provide remote access of enterprise facilities to authorized users, create new services, enable information extraction from the enterprise network and enable message based chatting. The messaging processing system can be hooked up to any telecommunication carrier. The message processing system is a single point facility in the enterprise network for sending and receiving messages. The message processor 101 provides an address search facility for locating the address of the recipient. The enterprise network is a local network connecting the members of an enterprise. The enterprise network brings together an array of network resources within the enterprise, such as servers, mainframes, intranets, printers, and the internet. The communication network is the overall network comprising of one or more enterprise networks and users external to the enterprise network. The message processor 101 also functions to identify all the users who are logged onto the enterprise network system. The solutions used by the users within the enterprise network to interface with the message processor 101 are hereafter referred to as user clients 107.

The message input means in the SMS or MMS system 100 includes client computers, personal digital assistants or mobile phones. The users create the message using either predetermined logic rules or unstructured text. The message processor 101 receives, processes and routes all incoming messages. The message processor 101 consists of a receiving agent 102, rule processing agent 103 and distributing agent 104.

The receiving agent 102 receives the incoming messages from the communication network and forwards the message to the users within the enterprise or to other users on the communication network.

The rule-processing agent 103 comprises a rule repository 103a that contains a set of logic rules for the processing of messages, routing engine 103b for routing the message to the intended recipient of the message and a natural language processing engine 103c for analyzing the contents of the messages.

The distribution agent 104 distributes the processed message received from the rule-processing agent. The distributing agent 104 comprises a message dispatcher 104a, pop up message dispatcher 104b, fax dispatcher 104c, e-mail and file dispatcher 104d, and phone call dispatcher 104e.

The virtual secretary 106 clients are customizable for each user of the enterprise network and each virtual secretary 106 contains a set of user specific processing rules that accept the user's request, applies its own set of processing rules, conducts a set of processing actions, and if required invokes the message processor 101 to further carry rule processing and distributing activities.

The virtual secretary 106 client consists of a rule repository 106a that contains a set of logic rules for the processing the messages, a user personal directory 106b to store all the personal address contacts, a text analyzer engine 106c to analyze all the incoming messages and invoke engine 106d for calling upon the rule processing and dispatching agents of the message processor 101.

A virtual secretary 106 client has the characteristics of any other user in the enterprise network. The message processor 101 views and treats the virtual secretary 106 as any other user of the enterprise network. If the address and name of the recipients of the message are not specified explicitly, the virtual secretary 106 client applies its logic rules to determine the recipients of the message.

Consider a mobile user who generates and transmits a message using a handheld mobile device, or a personal communication device or through a computer on the communication network. Assume that the user has configured his or her virtual secretary 106 to process his or her message in a predetermined manner. The message is first received by the message processor 101 and then forwarded to the respective virtual secretary. The virtual secretary 106 client processes the message using its predetermined logic earlier programmed by the user. If required, the virtual secretary 106 client invokes the message processor 101 to carry out one or more activities of rule processing and dispatching.

The receiving agent 102 either comprises a modem, or the receiving agent is directly connected by a leased line to the server of a telecommunication service provider.

The rule-processing agent 103 receives the SMS or MMS message from the receiving agent 102 and analyses the message. The rule-processing agent 103 contains a text interpreting rules engine 103a for analyzing the content of a message received from the receiving agent. The rule-processing agent 103 applies a set of predetermined rules to process messages. The application of the logic rules result in a set of processing, routing and dispatching activities. The rule-processing agent 103 contains a routing engine for routing messages in the enterprise network using either the recipient information in the address field or by following directions in the text of the message. The rule-processing agent 103 also contains a file execution engine that enables the execution of computer file programs from the message processor 101. The application of logic rules results in one or more activities like displaying a pop up text, text to voice conversion, text to fax conversion, computer file processing, file forwarding and e-mailing. Messages that do not satisfy logic rules are forwarded to a live operator who plays the role of a default receiver.

The distributing agent 104 comprises a SMS or MMS dispatcher 104a, pop up message dispatcher 104b, fax dispatcher 104c, e-mail and file dispatcher 104d and phone call dispatcher 104e. The message is delivered via the dispatcher to the intended recipient on the preferred channel of communication of the recipient. For a text to fax conversion, a fax dispatcher transmits the fax to the listed recipients. When a user places a SMS request for file forwarding, the file is moved to a predefined folder and the files are dispatched to the intended recipients as SMS or MMS messages using file transfer protocol (FTP).

The receiving agent connects to a modem, formats the message as understood by the modem and connects to the external network through the modem. In another embodiment, the communication agent directly connects to the server of a telecommunications carrier through a leased line or a virtual private network (VPN) connection.

The virtual secretary 106 client schedules the incoming and outgoing messages and optimizes the schedule depending on the traffic load of the delivery channels. The virtual secretary 106 client delivers messages during periods of off-peak tariffs and selects the most appropriate carrier based on the cost and quality of transmission. The virtual secretary 106 client receives, analyses and responds to the requests of a sender and answers back immediately. For example, the virtual secretary 106 searches an address book, mails a specific document, or faxes a document.

The exchange directory 105 contains access privileges that route when and through which distribution channels each user is permitted to send messages. It includes checks for allowed times, off peak tariffs, pending orders and group information. The exchange directory 105 provides additional information on the sender.

The message processor 101 pop-up is similar to an instant messenger. The pop up notifies and displays the received message on the recipient user's computer. The pop-up also interfaces with e-mail systems such as Microsoft Outlook Express, internet browsers such as Microsoft Internet Explorer and with commercial databases for composing new messages or responding to messages. The pop-up functions to file and retrieve messages. The pop up facility enables real time online chatting among the users of the enterprise network.

The message processor 101 includes a business logic dictionary for search groups in the enterprise network. Every possible activity name in the enterprise network is listed along with the associated group and responsible person.

The message processor 101 is a platform that integrates the messaging facility with the existing communication and information infrastructure of an enterprise and provides an intelligent communication and access channel across the enterprise. It requires a low investment for creation and maintenance as it can be deployed on the existing information and communication system infrastructure existing in an enterprise. For example, the message processor 101 can be deployed with Microsoft Windows 2000/NT or Microsoft XP. The message processor 101 integrates seamlessly with existing local area networks and wide area networks (LAN/WAN) of the enterprise. The message processor 101 maintains a log of all incoming and outgoing messages.

Figure 2:
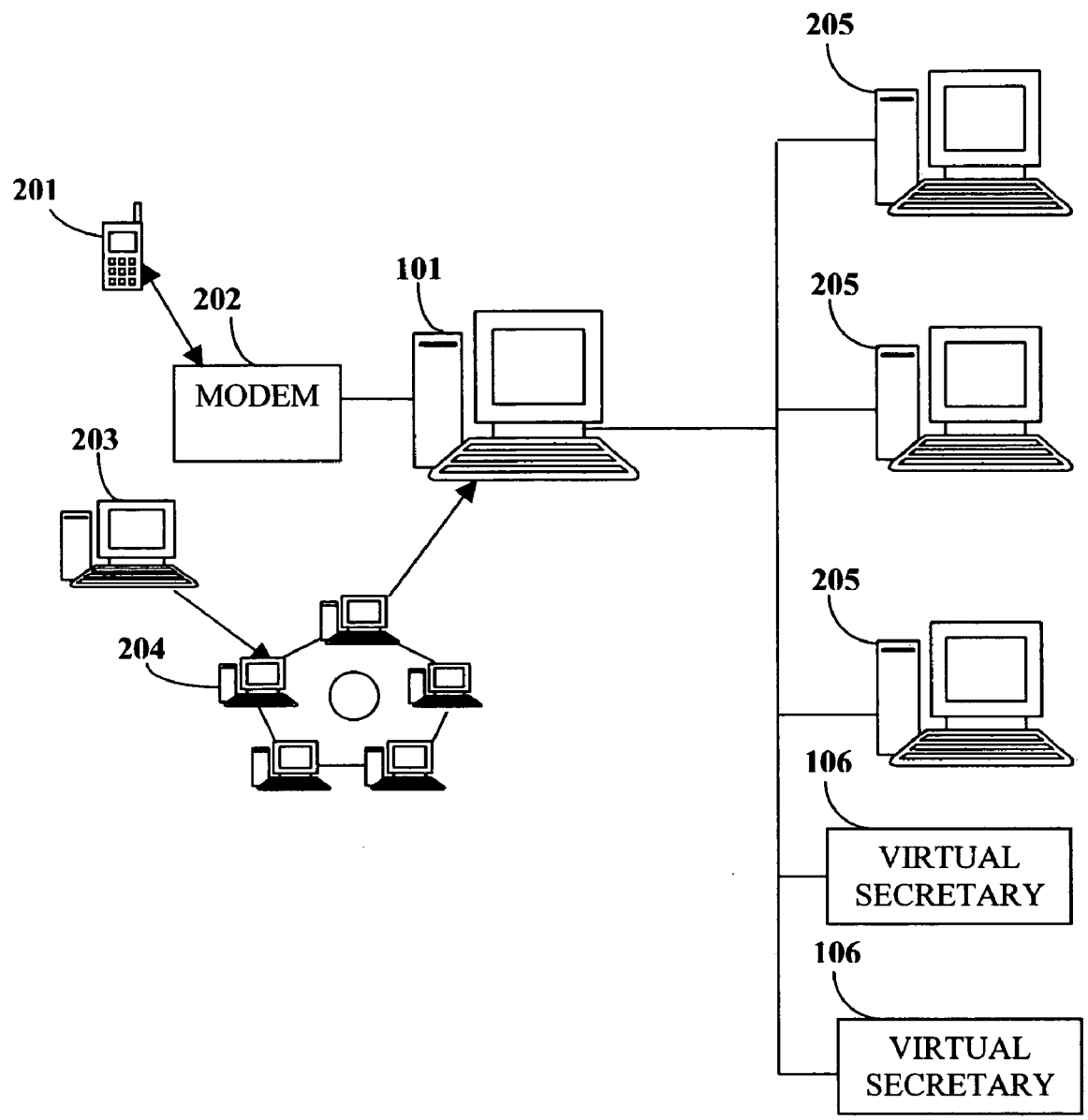
FIG. 2 illustrates the architecture of the communication system used for receiving, transmitting, processing and routing SMS and MMS messages.

FIG. 2 illustrates the overall communication system. The messages are generated either through mobile phones 201 or through SMS internet sites 203, 204 used for creating and transmitting messages. A modem 202 receives the incoming message and outputs the information to the message processor 101. The output of the message processor 101 is displayed as a pop-up on the computer 205 of the intended recipients.

Figure 3:
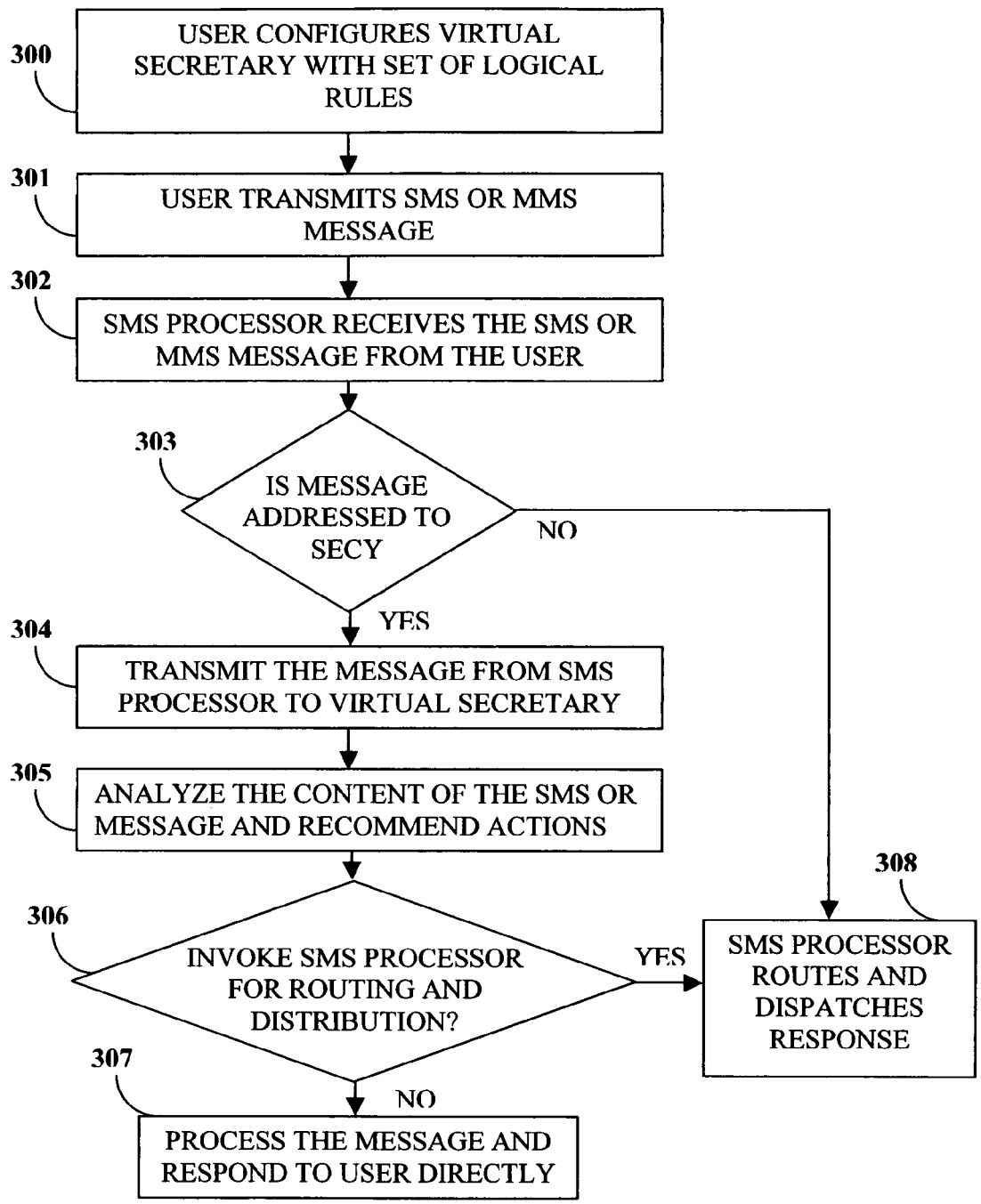
FIG. 3 describes the method of transmission, reception, processing and dispatching of messages from one user to another.

FIG. 3 illustrates the method of processing and managing SMS or MMS messages. Each user of the network configures 300 their own virtual secretary 106 client with a set of predetermined logic rules for analyzing and acting upon messages. When the user transmits a message 301, the message processor 101 receives the message 302 and directs it to the virtual secretary of the user 304, provided the message is addressed to the virtual secretary 106 of the user 303. If the message is not addressed to the virtual secretary 106 of the user, the message processor 101 processes and acts upon the message 308. The virtual secretary 106 analyzes the content of the message and applies the set of predetermined rules 305. If the processing of the message requires the input of one of the components of the message processor 101, the virtual secretary 106 invokes the message processor 101. The virtual secretary 106 can invoke actions at the message processor 101 such as file execution, address extraction from the exchange directory 105, routing and dispatching of messages. The final message is dispatched to the recipient using the dispatching systems 306 of the message processor 101 or the virtual secretary 106 directly responds to the user 307. The results are either sent as a SMS, displayed as a pop-up message, faxed, e-mailed or dispatched as a phone call.

A virtual user called Secy is created in the message processor 101 for each user in the enterprise network. Secy is similar to any other user in the local area network of the enterprise. A client program called Virtual_Secy.exe is also created. The client program is executed for the user "Secy". All SMS or MMS messages addressed to Secy are moved to the inbox of Secy. The client program picks up the messages from the inbox of Secy and processes them. The client program is capable of replying to the message, for example, through SMS or MMS, e-mail, fax or phone call. The client program is capable of invoking the message processor 101 to search the exchange directory 105 of the message processor 101.

The virtual secretary 106 client can run on a Microsoft Inc. system or any non-Microsoft Inc. system, for example, UNIX or Linux server. Depending on the instructions of the incoming SMS or MMS message, Secy can perform functions such as e-mail documents or messages, conduct a remote execution of commands, search a directory, navigate the internet, forward SMS or MMS messages, search log files, auto-reply and count messages.

A user can direct the virtual secretary 106 client to convert an incoming SMS or MMS to e-mail, or, to e-mail a message or document. The e-mail address of a person can be specified explicitly or can be searched in the exchange directory of the message processor 101 or the personal address directory 106b of the virtual secretary 106 client.

The following instruction format is used to request Secy to e-mail a message using a SMS input:
Format: <keyword> <options> <name|e-mail-ID> <message/document name>
The keyword in the above format refers to an exchange directory user name, in this example, "Secy".
Options: m, mailto, mail, md.
Name/Email ID: The e-mail-id can be explicitly mentioned, or for a given name, the client program will search for the e-mail id corresponding to the given name.
Message: The message includes the SMS message text that is sent as an e-mail, or the document name. Comma separated multiple document names can be entered. For sending documents, the option used is 'md'.

Any message starting with the word "secy" is delivered to the user secy.

The following example illustrates a sales person using Secy to address a customer request. The customer requests a document on the price list. The sales person sends an SMS using his mobile phone to the message processor 101 using a keyword Secy followed by md, further followed by the e-mail address of the customer and the name of the document. The customer will receive the price list document by e-mail.

The SMS from the sales person will read:
SMS Message: secy md Robert pricing.doc
The document user_manual.doc will be sent to Robert as an attachment.
The e-mail sent by Ram on the customer's computer will read:
Subject: Mail from Ram
Please find enclosed document from Mr. Ram on Pricing.
Thanks.
Ram
Company Name
Mobile Number
Consider the following additional example:
SMS Message: secy md robert@yahoo.com user_manual.doc, Effortest.doc In this case, the mail will be sent to robert@yahoo.com with documents as an attachment.

The following example illustrates the communication between John and Robert, with Secy facilitating the communication. John is traveling and wishes to send a brief message to his friend Robert.

John composes and transmits one of the following three SMS messages to Robert on his mobile phone:
SMS Message: secy m Robert Hello, are you there?
SMS Message: secy mail Robert Hello, are you there?
SMS Message: secy mailto Robert hello, are you there?
Robert will receive the SMS as:
Subject: Mail from John
Hello, are you there?
Thanks
Ram
Company Name
Mobile Number The e-mail-id corresponding to Robert will be extracted from the message processor's 101 exchange directory 105 and the message will be mailed to the extracted e-mail id of Robert.
SMS Message: Secy m Robert@yahoo.com Hello are u there?
The message "Hello are u there?" will be mailed to robert@yahoo.com.

The following example illustrates the remote execution of commands using an SMS. via a SMS. John directs Secy to send the results of an execution of a specified application.
Format of SMS message: <keywords> <options> <application name> <command line arguments>
Keywords: User name or the registered keyword. (Secy)
Options: e, execute.
Application name: Name of the application, the application must reside in the exe's folder of message processor 101. The message processor 101 contains a folder containing executable computer files.
Command line arguments: Command line arguments (optional).
The following example illustrates the request for dispatching the results of the execution of a computer file.
SMS message: Secy e send_message.exe
The virtual secretary 106 will search for the file send_message.exe in exes directory. If the file is found, the virtual secretary 106 will execute the file and send an SMS back with the execution results.
The following additional example illustrates the request for dispatching the results of the execution of a computer file.
SMS message: Secy execute reply.exe arg1 arg2
The virtual secretary 106 will execute the program reply.exe with arg1 and arg2 as command line arguments.
The following commands are used for searching a directory using an SMS.
To retrieve a particular address details from the personal directory of Secy or exchange directory of the message processor 101, the following commands are used.
Format: <keyword> <options> <name>
Keyword: The user name or the registered keyword (Secy)
Options: key, s and search.
Name: Name to search or the key value.
The following example illustrates the extraction of the address of the intended recipient.
SMS Message: Secy s William
The virtual secretary 106 will search first search its own address book, i.e. search address_book.dat. If a match is not found, then virtual secretary 106 searches the exchange directory 105 of the message processor 101. The details of Williams will be sent back to the user as a SMS message.
The virtual_secretary uses the following data files: Information.dat, Address_book.dat and Secretarial.dat. Each line in the Information.dat file consists of a Key and its associated text or value. The Information.dat file is searched by the Virtual Secretary 106 to get the value of a Key. The file contains several lines of data. The Key is separated from its associated value by a white space or '='.
The Address_book.dat file contains the list of addresses.
The Secretarial.dat file classifies information.
The Log Files store every incoming and outgoing message in the message processor 101.
The Virtual Secretary 106 creates following log files:
outgoing.log: Contains log of all the outgoing SMS, e-mail and pop-up messages.
incoming.log: Contains log of all the incoming SMS messages.
Virtual_secretary.log: Contains general Logs including starting time
This invention is explained by way of the following example: An organization, ABC Limited, has installed the invention in their corporate enterprise network. The published phone number of the message processor 101 is 9845012345. A GSM/GPRS/CDMA compatible modem with this number is attached to the message processor 101.

Peter is an employee of ABC Limited; his telephone extension number is 167. John is a friend of Peter who is not employed at ABC Limited. John tries to contact Peter, but all incoming phone lines are busy and John has therefore decided to send a SMS message.

John sends the following SMS message to Peter on 9845012345: "Peter when are you available for the meeting today?" The message processor 101 receives the message and locates Peter's computer and delivers the message to him through a pop-up message. The pop up message on Peter's computer will read: From 9845009876 [ ]—"Peter, When are you available for the meeting today?" Received at 9:45, sent at 9:30 12 Feb. 2005. Peter has an option to reply to John by SMS.

This invention is explained by way of the following additional example: Steve is working with XYZ, Inc. Steve's mobile phone number is 9845001232, e-mail address is Steve@XYZ.com, office number is (080) 3332455, fax number is (080) 3332466. XYZ Inc. is a customer of ABC Limited. Steve has given a CD Writer for repair to ABC Limited and the Return Material Authorization (RMA) number is 20031. Steve sends the following SMS message to the Repair Department of ABC Limited at 984501234: "To Repair Center: When will my CD Writer RMA 20031 be repaired?"

The message processor 101 receives the message sent by Steve and forwards it to the Enquiry Section of the Repair Center. The message addressed to the manager of the Repair Center is "From 9845001232 [Steve (XYZ Inc.), Steve@XYZ.com Phone: (080) 332455 Fax: (80) 3332466]—"To Repair Center: When will my CD Writer RMA 20031 be repaired?" Received at 3:45, sent at 4:30 15 Feb. 2005. The Repair Department can reply over SMS, or e-mail or fax. Optionally, an auto-reply is sent.

This invention is illustrated by way of the following additional example. Mary is a colleague of Peter. Mary desires to contact Peter and Ram over her mobile phone 9822032123. Mary would like Ram to receive her message if Peter is not available.

Mary sends the following SMS message to 9845012345: "Peter and Ram, please contact Ron (98456356). Ron has a pricing question you can address".

The message processor 101 receives the message, the rules processing agent analyses the message, and the distributing agent 104 sends it to Ram and Peter separately. Ram receives the message as: From 9822032123 [Mary (ABC Ltd.), Phone: 803322477 Fax: 803322478]—"Peter and Ram, please contact Ron (98456356). Ron has a pricing question you can address", received at 2:45, sent at 2:50 14 Feb. 2005.

This invention is illustrated by way of the following additional example: Mary is traveling and needs the contact details of the travel agent of the company ABC Inc., but the office is closed. She sends a message to Secy—"Secy s Travel Agent" Secy receives the message from Mary and sends back the contact details from the its personal address directory.

Mary wants to provide her client the company price list. She sends an SMS to Secy: 984501234 "Secy md Jack@yahoo.com price-list"

The message processor 101 transfers the SMS message from Mary to "Secy" with details "MD Price-List". Secy sends an e-mail to Jack attaching the price list and other pricing related documents.

The invention claimed is:

1. A system for receiving, processing and routing a message, wherein said message is a short message service or multimedia message service message, comprising:
   a message processor for receiving, processing and routing said message, further comprising;
      a receiving agent for receiving the message and for forwarding the message to a rule processing agent;
      said rule processing agent further comprising:
         a rule repository logic that contains a set of logic rules for processing the message;
         a natural language processing engine for analyzing the text of said message
         a routing engine for routing the message to the intended recipient of the message;
      a distribution agent for distributing the processed message received from the rule processing agent, further comprising a short messaging service or multimedia messaging service messages dispatcher, pop-up message dispatcher, e-mail dispatcher, fax dispatcher and phone call dispatcher; and
   a plurality of virtual secretary clients serving a plurality of users respectively, wherein each virtual secretary client is created and customized by its respective user, said virtual secretary client further comprising:
      a rule repository that contains a set of logic rules for processing the message;
      a user personal directory to store personal address contacts of said user;
      a text analyzer engine to analyze the incoming message;
      an invoke engine, wherein if processing of the message in the virtual secretary client requires inputs of the message processor, said invoke engine invokes actions at the message processor; and
   wherein said message processor first receives said message from a user, and if the message is addressed to the virtual secretary client of said user, the message processor forwards the message to the virtual secretary client assigned to the user.

2. The system of claim 1, wherein the message is generated by one or more of mobile phones, user client computers, personal communication devices and direct leased lines to the servers of communication network providers.

3. The system of claim 1, wherein the user client comprises a computer program for displaying a pop-up message of the incoming message from the individual user on the computer screen of the recipients.

4. The system of claim 1, wherein the user client comprises a text to audio conversion means for creating and playing the audio of the incoming message.

5. The system of claim 1, wherein the message processor is in communication with a fax for transmitting a fax.

6. The system of claim 1, wherein the virtual secretary client is directed to execute a computer file and provide the executed results to recipients via the message processor.

7. The system of claim 1, wherein the message processor is customized to address needs of customer relationship management systems, supply chain systems, sales force automation systems, material distribution systems, hospitality management systems, hospital systems, retailer systems and communication service provider systems.

8. The system of claim 1, wherein the message processor comprises an exchange directory for searching a contact address upon a short message service request and for providing the contact address back to the sender.

9. The system of claim 1, wherein the message processor, upon request of a user, can email requested documents to recipients listed by the user.

10. The system of claim 1, wherein the message processor, upon request of a user, can initiate a phone call to the user.

11. The system of claim 1, wherein the message processor is in communication with the internet for browsing and extracting information from the internet upon request of a user.

12. The system of claim 1, wherein the message processor, upon request of a user, can initiate a phone call.

13. The system of claim 1, wherein the virtual secretary client has characteristics of any other user in a network, and wherein the message processor treats the virtual secretary client as any other user client of the network.

14. The system of claim 13, wherein if the address and name of the recipients of the message are not specified explicitly in the message, the virtual secretary client applies its logic rules to determine the recipient of the message.

15. The system of claim 1, wherein the virtual secretary client contains a set of user specific rules to:
   conduct a set of processing actions; and
   if required, invoke the message processor to carry out further rule processing and distributing activities.

16. The system of claim 1, wherein the invoke engine invokes the message processor to carry out one or more activities of rule processing, distributing messages, file execution, searching the exchange directory and extracting addresses from an exchange directory.

17. The system of claim 1, wherein the virtual secretary client schedules the incoming and outgoing messages, and optimises the schedule of the incoming and outgoing messages depending on the traffic load of delivery channels.

18. A method of processing and managing a message sent by a user, wherein said message is a short messaging service or multimedia messaging service message, comprising the steps of:
   configuring a virtual secretary client by said user with a set of logic rules for analyzing and acting upon the messages;
   receiving said message at a message processor, and if the message is addressed to a virtual secretary client of the user, forwarding the message by the message processor to said virtual secretary client specifically assigned to the user; and
   analysing the text content of the short messaging service or multimedia messaging service messages message at the virtual secretary client by applying said set of logic rules and performing one or more of the following functions comprising:
      displaying the short messaging service or multimedia messaging service messages on the computer of the recipients of the message in a pop-window;
      performing a text to voice conversion of the message and playing the voice to the recipient;
      faxing a document to the recipient of the message using the instructions in the message of the short messaging service or multimedia messaging service messages;

initiating a phone call to the recipient using the instructions in the short messaging service or multimedia messaging service messages;

extracting and e-mailing a computer file;

browsing the internet, extracting information from the internet; and e-mailing or short messaging service or multimedia messaging service messaging the extracted information from the internet to the recipients of the message; and wherein if the processing of the message in the virtual secretary client requires the inputs of the message processor, said invoke engine performs the step of;

invoking actions at the message processor.

* * * * *